United States Patent
Kim et al.

(10) Patent No.: US 8,641,782 B2
(45) Date of Patent: Feb. 4, 2014

(54) COMPACT EXOSKELETON ARM SUPPORT DEVICE TO COMPENSATE FOR GRAVITY

(75) Inventors: Jeong Hun Kim, Suwon-si (KR); Young Bo Shim, Seoul (KR); Soo Sang Yang, Suwon-si (KR); Yong Jae Kim, Seoul (KR); Kwang Jun Kim, Ansan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 615 days.

(21) Appl. No.: 12/979,861

(22) Filed: Dec. 28, 2010

(65) Prior Publication Data

US 2011/0164949 A1 Jul. 7, 2011

(30) Foreign Application Priority Data

Jan. 6, 2010 (KR) ........................ 10-2010-0000988

(51) Int. Cl.
*A61F 2/66* (2006.01)
*A61F 2/54* (2006.01)
*B25J 3/04* (2006.01)
*B25J 18/04* (2006.01)
*B25J 17/00* (2006.01)

(52) U.S. Cl.
USPC .................. 623/58; 623/57; 700/245; 414/5; 414/6; 74/490.05

(58) Field of Classification Search
USPC .......... 74/490.01, 490.05; 414/1, 4, 5, 6, 680; 901/15, 23, 28; 700/245; 623/26, 57, 623/58; 601/33
See application file for complete search history.

(56) References Cited

U.S. PATENT DOCUMENTS

| | | | |
|---|---|---|---|
| 4,180,870 A * | 1/1980 | Radulovic et al. .............. 623/26 |
| 5,845,540 A * | 12/1998 | Rosheim .................... 74/490.05 |
| 6,301,526 B1 * | 10/2001 | Kim et al. ..................... 700/260 |
| 7,410,338 B2 * | 8/2008 | Schiele et al. .................... 414/4 |
| 2003/0223844 A1 * | 12/2003 | Schiele et al. .................... 414/5 |
| 2007/0225620 A1 * | 9/2007 | Carignan et al. .................. 601/5 |
| 2009/0210093 A1 * | 8/2009 | Jacobsen et al. .............. 700/260 |
| 2010/0016766 A1 * | 1/2010 | Zhang et al. ...................... 601/5 |
| 2010/0204804 A1 * | 8/2010 | Garrec ............................ 623/24 |
| 2010/0217163 A1 * | 8/2010 | Sankai .............................. 601/5 |
| 2012/0232698 A1 * | 9/2012 | Koga et al. .................... 700/261 |
| 2012/0330198 A1 * | 12/2012 | Patoglu .......................... 601/33 |

* cited by examiner

*Primary Examiner* — Patrick Cicchino
(74) *Attorney, Agent, or Firm* — Staas & Halsey LLP

(57) ABSTRACT

A compact exoskeleton arm support device compensates for gravity. The compact exoskeleton arm support device compensating for gravity may include at least five joints. Among the at least five joints, two joints may be driven by actuators, and the remaining joints may be driven by user force. The compact exoskeleton arm support device compensating for gravity effectively uses the actuators, thereby increasing operating efficiency and reducing production costs.

14 Claims, 11 Drawing Sheets

COMPACT EXOSKELETON ARM SUPPORT DEVICE TO COMPENSATE FOR GRAVITY

CROSS-REFERENCE TO RELATED APPLICATIONS

This application claims the benefit of Korean Patent Application No. 10-2010-0000988, filed on Jan. 6, 2010 in the Korean Intellectual Property Office, the disclosure of which is incorporated herein by reference.

BACKGROUND

1. Field

Example embodiments relate to a compact exoskeleton arm support device to compensate for gravity.

2. Description of the Related Art

Robots are applicable in various fields. These robots include industrial robots used in unmanned automated manufacturing lines, rehabilitation medical robots for patients or the elderly, and home robots to provide life convenience.

In order to manufacture large-scale products, such as semiconductors or vehicles, an unmanned automated manufacturing line may be designed.

However, in product groups where user requirements rapidly change, such as cellular phones or televisions, it may be difficult to install the unmanned automated manufacturing line. In these product groups, a cell-type manufacturing line is installed such that persons directly manufacture products in a cell type to enable the products to be easily and rapidly changed.

However, on the cell-type manufacturing line, workers perform repetitious tasks and may suffer from muscle fatigue at a designated body part. These workers use only a special muscle, and may easily suffer from arthritis.

SUMMARY

Therefore, it is an aspect of the example embodiments to provide a compact exoskeleton arm support device to compensate for gravity which supports weight of an arm or load to compensate for gravity.

It is another aspect of the example embodiments to provide a compact exoskeleton arm support device to compensate for gravity by using a small number of conveniently usable actuators.

The foregoing and/or other aspects are achieved by providing a compact exoskeleton arm support device to compensate for gravity and to support an arm using a plurality of members, the plurality of members including a first rotating joint enabling the entire arm to rotate in a yaw direction, a second rotating joint enabling a forearm of the arm to rotate in the yaw direction, a third rotating joint enabling the forearm of the arm to rotate in a pitch direction, a first translating joint enabling the forearm of the arm to translate in a gravity direction, and a second translating joint arranged between the first rotating joint and second rotating joint, and enabling the second rotating joint to translate, wherein the first rotating joint, the second rotating joint, and the second translating joint are manually driven by user force, and the third rotating joint and the first translating joint are driven by actuators.

The compact exoskeleton arm support device to compensate for gravity may include a first sensor to sense a load of the arm and to drive the actuators.

The compact exoskeleton arm support device to compensate for gravity may further include a second sensor to sense a load of an object applied to the arm and to drive the actuators in cooperation with the first sensor.

The compact exoskeleton arm support device to compensate for gravity may further include a control unit to check movement of the arm using the first sensor and the second sensor.

The plurality of members may include a frame, and a base connected to the frame by the first translating joint allowing the base to translate.

The actuators may include a first actuator driving the first translating joint to move the base.

The plurality of members may further include a first supporter connected to the base by the first rotating joint allowing the first supporter to rotate.

The plurality of members may further include a second supporter connected to the first supporter by the second translating joint allowing the second supporter to translate.

The plurality of members may further include a forearm support unit connected to the second supporter by the second rotating joint and the third rotating joint allowing the forearm support unit to rotate.

The actuators may include a second actuator driving the third rotating joint to rotate the forearm support unit.

The compact exoskeleton arm support device to compensate for gravity may include a first sensor installed on the third rotating joint to sense a load of the arm applied to the forearm support unit.

The forearm support unit may include an object fixing part to support an object, and a second sensor installed on the object fixing part to sense a load of the object applied to the forearm support unit.

Each of the first sensor and the second sensor may include a force-torque sensor.

The foregoing and/or other aspects are achieved by providing a compact exoskeleton arm support device to compensate for gravity assisting movement of an arm using a plurality of joints, and the plurality of joints may include a first rotating joint enabling the entire arm to rotate in a yaw direction, a first translating joint enabling a forearm of the arm to perform a first translation, and a second translating joint enabling the forearm of the arm to perform a second translation to determine the position of an elbow of the arm, and a second rotating joint enabling the forearm of the arm to rotate in the yaw direction, and a third rotating joint enabling the forearm of the arm to rotate in a pitch direction to determine a position of the forearm of the arm, wherein, among the plurality of joints, the first translating joint determining the position of the elbow of the arm in a gravity direction and the third rotating joint determining the position of the forearm of the arm in the pitch direction are driven by actuators, and the remaining joints are driven by user force.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
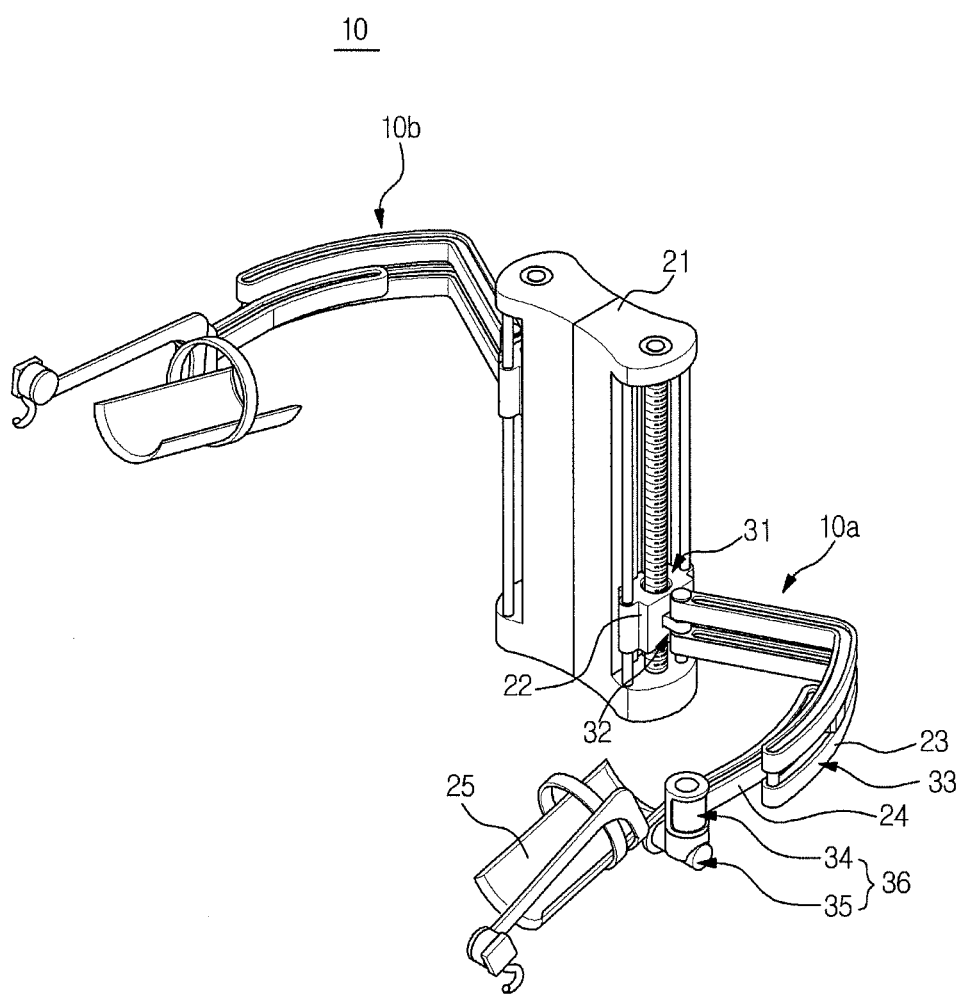
FIG. 1 is a perspective view illustrating a pair of compact exoskeleton arm support devices in accordance with example embodiments.

Reference will now be made in detail to the embodiments, examples of which are illustrated in the accompanying drawings, wherein like reference numerals refer to like elements throughout.

Figure 2:
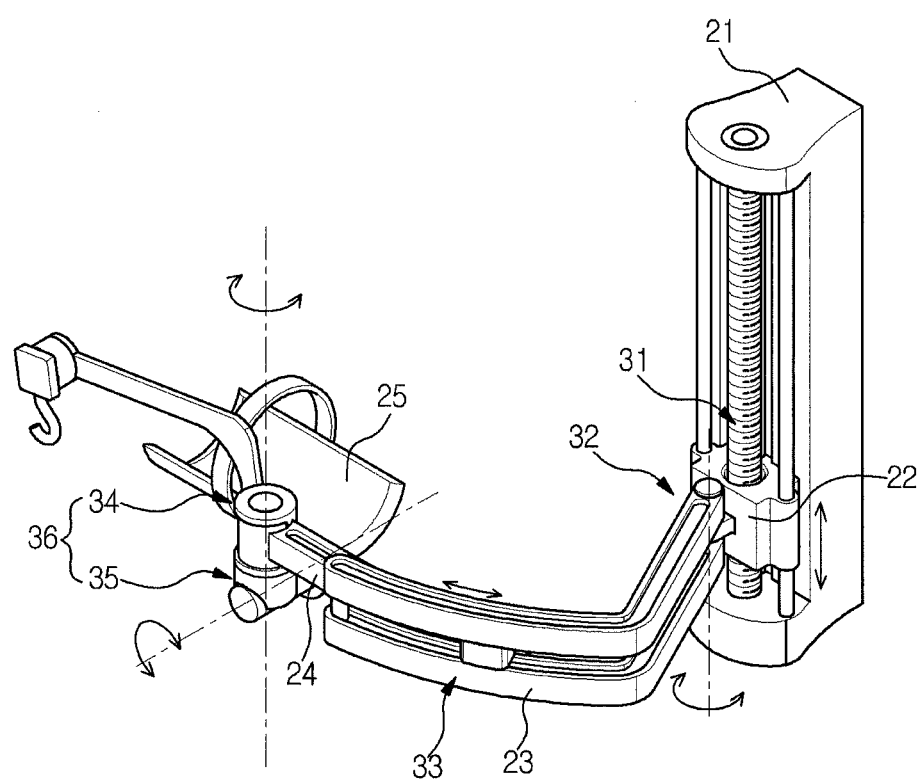
FIG. 2 is a perspective view illustrating respective joints of the compact exoskeleton arm support device in accordance with example embodiments.

FIG. 1 is a perspective view illustrating a pair of compact exoskeleton arm support devices in accordance with example embodiments, and FIG. 2 is a perspective view illustrating respective joints of the compact exoskeleton arm support device in accordance with example embodiments.

As shown in FIGS. 1 and 2, a compact exoskeleton arm support device 10 may be configured to support a human arm. Two arm support devices 10 may be provided to support both human arms. A first arm support device 10a may be configured to support a left human arm, and a second arm support device 10b may be configured to support a right human arm. One of the first arm support device 10a and the second arm support device 10b may be used, or both the first arm support device 10a and the second arm support device 10b may be used. The first arm support device 10a and the second arm support device 10b may have the same configuration, and may be generally referred to as the arm support devices 10.

In general, a robot arm may include a shoulder joint having three degrees of freedom (DOFs), an elbow joint having one DOF, and a wrist joint having three DOFs.

In accordance with example embodiments, the arm support device 10 may include a plurality of members 21-25. The plural members 21-25 of the arm support device 10 may be connected through at least five joints 31-35 to have at least five DOFs. The at least five joints 31-35 of the arm support device 10 may not correctly correspond to the joints of the robot arm, but may provide optimum motion to a worker if the worker works on a cell-type manufacturing line while wearing the arm support device 10. For example, the arm support device 10 may not include a joint corresponding to the wrist joint of the robot arm allowing a user to perform a delicate task. Further, the arm support device 10 may obtain at least five DOFs at parts thereof corresponding to the shoulder joint and the elbow joint of the robot arm, thereby allowing the user to freely move the arm.

The plural members 21-25 of the arm support device 10 may include a frame 21, a base 22, a first supporter 23, a second supporter 24, and a forearm support unit 25. These plural members 21-25 may be connected by the plural joints 31-35. The plural joints 31-35 of the arm support device 10 may include at least five joints 31-35, i.e., a first translating joint 31, a first rotating joint 32, a second translating joint 33, a second rotating joint 34, and a third rotating joint 35.

The arm support device 10 may further include actuators 40 to drive the first translating joint 31 and the third rotating joint 35.

Figure 3:
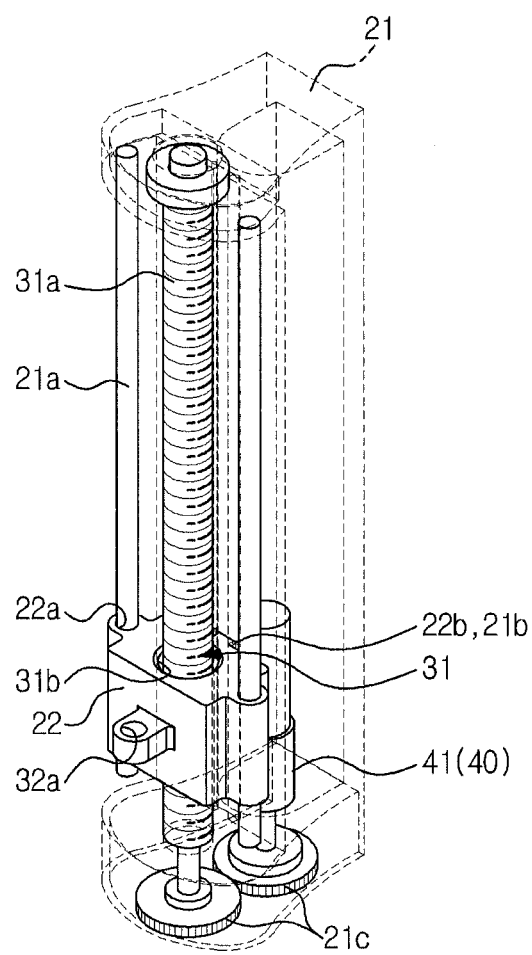
FIG. 3 is a view illustrating a first translating joint in accordance with example embodiments.

FIG. 3 is a view illustrating the first translating joint in accordance with example embodiments.

As shown in FIGS. 1 to 3, the frame 21 and the base 22 may be connected by the first translating joint 31.

The frame 21 may be mounted on a worker's back. The frame 21 may support the entire arm support device 10. Further, the frame 21 may be mounted on a peripheral apparatus of a manufacturing line where workers manufacture products.

The base 22 may perform translation in the vertical direction on the frame 21 by using the first translating joint 31.

The first translating joint 31 may include a ball screw 31a and a ball nut 31b. The ball screw 31a may be rotatably connected to the frame 21, and the ball nut 31b may be formed on the base 22.

The first translating joint 31 may be driven by a first actuator 41. As the first actuator 41 drives the first translating joint 31, the base 22 may move in the vertical direction on the frame 21. When the first actuator 41 rotates the ball screw 31a of the frame 21 through connection gears 21c, the base 22 may move in the vertical direction by the ball nut 31b of the base 22 engaged with the ball screw 31a of the frame 21.

The base 22 may move in the vertical direction while being guided by the frame 21. Guide shafts 21a may be respectively installed at both sides of the ball screw 31a of the frame 21. The guide shafts 21a may be inserted into guide hole 22a and are formed through the base 22. Further, the base 22 and the frame 21 may be connected to each other by dovetail structures 21b and 22b. Thereby, rotation of the base 22 may be restricted, and generation of unnecessary force (for example, rotating moment) between the ball screw 31a of the frame 21 and the ball nut 31b of the base 22 may be prevented.

Figure 4:
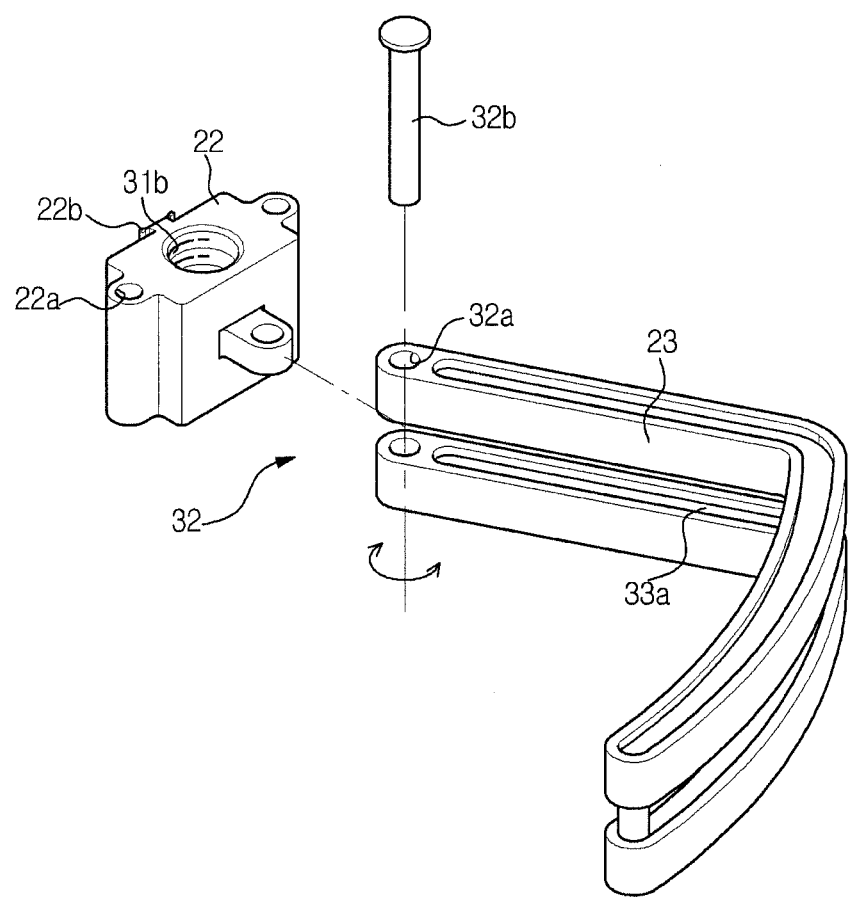
FIG. 4 is a view illustrating a first rotating joint in accordance with example embodiments.

FIG. 4 is a view illustrating the first rotating joint in accordance with example embodiments.

As shown in FIGS. 1 to 4, the base 22 and the first supporter 23 may be connected through the first rotating joint 32.

The first supporter 23 may perform reciprocating rotation on the base 22 by means of the first rotating joint 32. Further, the first supporter 23 may be formed in a curved shape. This shape of the first supporter 23 may provide the optimum arm motion.

The first rotating joint 32 may include first hinge holes 32a and a first hinge shaft 32b. The first supporter 23 may be rotated around the first hinge shaft 32b by inserting the first hinge shaft 32b into the first hinge holes 32a provided on the base 22 and the first supporter 23.

Figure 5:
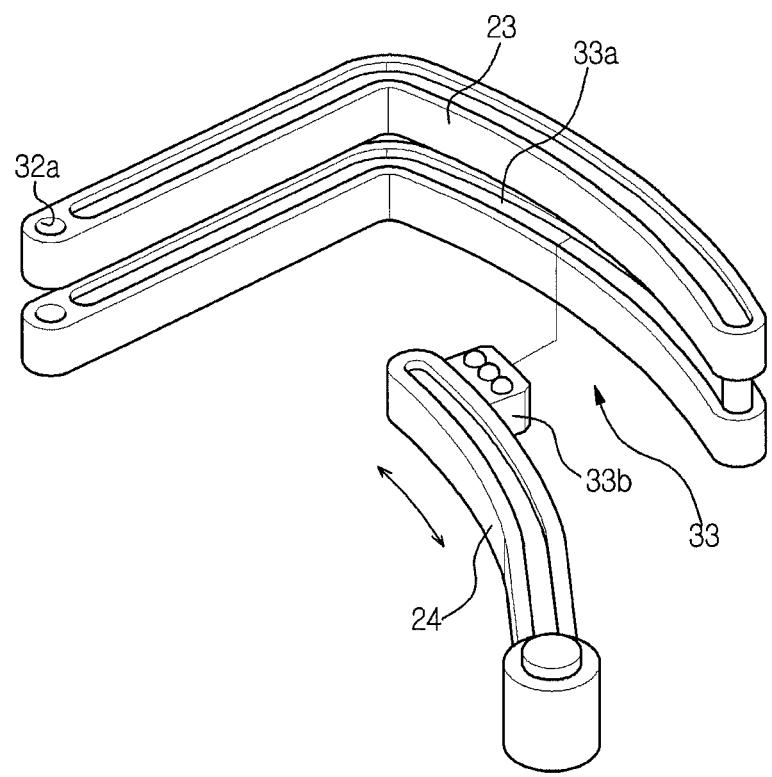
FIG. 5 is a view illustrating a second translating joint in accordance with example embodiments.

FIG. 5 is a view illustrating the second translating joint in accordance with example embodiments.

As shown in FIGS. 1 to 5, the first supporter 23 and the second supporter 24 may be connected by the second translating joint 33.

The second supporter 24 may perform translation in the forward and backward direction on the first supporter 23 by means of the second translating joint 33.

The second translating joint 33 may include a sliding groove 33a and a sliding protrusion 33b. The sliding groove 33a may be formed on the first supporter 23, and the sliding protrusion 33b may be formed on the second supporter 24. Rollers or ball bearings may be installed between the sliding groove 33a and the sliding protrusion 33b, thereby allowing the second supporter 24 to move relative to the first supporter 23.

Figure 6:
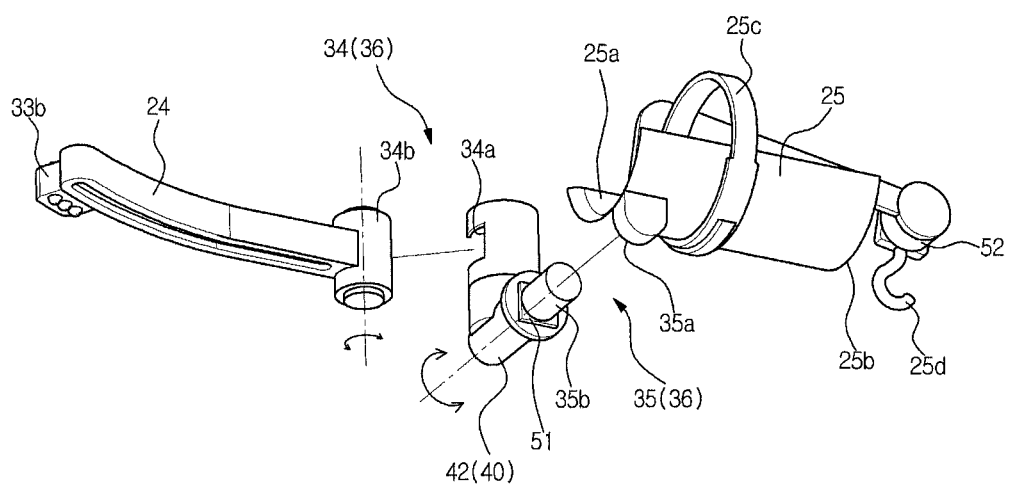
FIG. 6 is a view illustrating a second rotating joint and a third rotating joint in accordance with example embodiments.

FIG. 6 is a view illustrating the second rotating joint and the third rotating joint in accordance with example embodiments.

As shown in FIGS. 1 to 6, the second supporter 24 and the forearm support unit 25 may be connected by the second rotating joint 34 and the third rotating joint 35.

A worker's forearm may be supported by the forearm support unit 25. A worker's elbow may be supported by a first support part 25a of the forearm support unit 25, and a worker's wrist may be supported by a second support part 25b of the forearm support unit 25. The forearm may be inserted into a fixing part 25c and is formed at the side of the first support part 25a of the forearm support unit 25 to fix the forearm to the forearm support unit 25. On the other hand, no restriction device may be provided at the second support part 25b of the forearm support unit 25 to allow the wrist to move freely to increase operating efficiency of the arm support device 10.

Further, an object fixing part 25d to support an object may be provided on the forearm support unit 25. The object fixing part 25d may be a hook shape and the object may be fixed to the object fixing part 25d.

The second rotating joint 34 and the third rotating joint 35 may form an elbow joint unit 36.

The second rotating joint 34 may include a second hinge hole 34a and a second hinge shaft 34b. The second hinge shaft 34b provided on the second supporter 24 may be inserted into the second hinge hole 34a provided on the elbow joint unit 36, thereby allowing the forearm support unit 25 to be rotated reciprocatingly around the second hinge shaft 34b.

The third rotating joint 35 may include a third hinge hole 35a and a third hinge shaft 35b. The third hinge shaft 35b provided on the elbow joint unit 36 may be inserted into the third hinge hole 35a provided on the forearm support unit 25, thereby allowing the forearm support unit 25 to be rotated reciprocatingly around the third hinge shaft 35b. The third hinge shaft 35b may be installed perpendicularly to the second hinge shaft 34b.

A second actuator 42 may be installed on the third rotating joint 35. The second actuator 42 may drive the third rotating joint 35 to rotate the forearm support unit 25.

A first sensor 51 may be installed on the third rotating joint 35 to measure a load of the arm applied to the forearm support unit 25. The first sensor 51 may include a force-torque sensor.

Further, a second sensor 52 may be installed on the object fixing part 25d to measure the load of the object applied to the object fixing part 25d. The second sensor 52 may include a force-torque sensor.

A control unit (not shown) may receive values measured by the first sensor 51 and the second sensor 52 and check movement of the user's arm, and then drive the first actuator 41 and the second actuator 42 and compensate for gravity to allow the user's arm to easily move.

If an object is not fixed to the object fixing part 25d, the second sensor 52 may not be operated. The first sensor 51 may measure a load of the arm.

The control unit may set the value measured by the first sensor 51 to a first reference value. If the user lifts his/her arm, the first sensor 51 may obtain a value smaller than the first reference value, and the control unit may understand that the user's arm moves upward. Thereafter, the control unit may drive the first actuator 41 and the first translating joint 31 to move the base 22 upward, and drive the second actuator 42 and the second rotating joint 34 to move the forearm support unit 25 upward.

On the other hand, if the user lowers his/her arm, the first sensor 51 may obtain a value greater than the first reference value, and the control unit may understand that the user's arm moves downward. Thereafter, the control unit may drive the first actuator 41 and the first translating joint 31 to move the base 22 downward, and drives the second actuator 42 and the third rotating joint 35 to move the forearm support unit 25 downward.

Thereafter, if an object is fixed to the object fixing part 25d, the second sensor 52 may measure a load of the object. First sensor 51 may measure loads of the arm and the object.

The control unit may set the value measured by the first sensor 51 to a second reference value. If the user lifts his/her arm, the first sensor 51 may obtain a value smaller than the second reference value, and the control unit may understand that the user's arm moves upward. Thereafter, the control unit may drive the first actuator 41 and the first translating joint 31 to move the base 22 upward, and drive the second actuator 42 and the second rotating joint 34 to move the forearm support unit 25 upward.

On the other hand, if the user lowers his/her arm, the first sensor 51 may obtain a value greater than the second reference value, and the control unit may understand that the user's arm moves downward. Thereafter, the control unit may drive the first actuator 41 and the first translating joint 31 to move the base 22 downward, and drive the second actuator 42 and the third rotating joint 35 to move the forearm support unit 25 downward.

Since the second reference value is greater than the first reference value, the control unit may increase driving force of the actuators 40 to allow the user to easily move the object.

Figure 7:
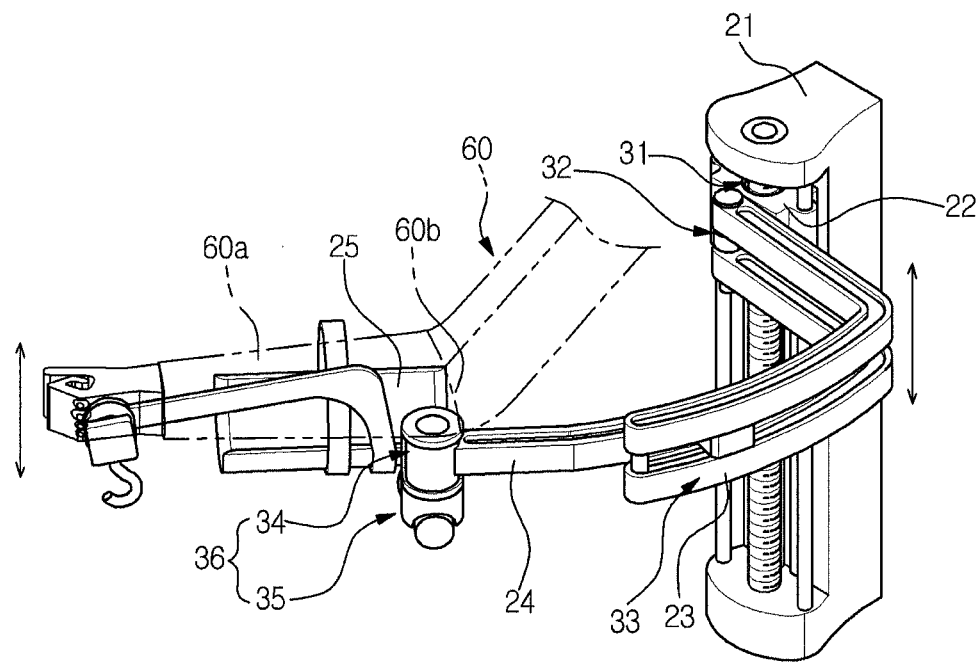
FIG. 7 is a view illustrating translation of a forearm of an arm in a gravity direction using the compact exoskeleton arm support device in accordance with example embodiments.

FIG. 7 is a view illustrating translation of a forearm of a user's arm in a gravity direction using the compact exoskeleton arm support device in accordance with example embodiments.

As shown in FIGS. 1 to 7, the first translating joint 31 of the arm support device 10 may cause a forearm 60a of an arm 60 to perform reciprocating translation in the vertical direction. The first translation joint 31 may cause the base 22 to reciprocate on the frame 21.

The first translating joint 31 may be driven by the first actuator 41. If the control unit checks movement of the arm 60 using the first sensor 51 and the second sensor 52, the first actuator 41 may drive the first translating joint 31 to compensate for the movement of the arm 60 in the gravity direction. When the control unit understands that the arm 60 moves upwardly, the control unit may drive the first actuator 41 to move the base 22 upward, and when the control unit understands that the arm 60 moves downwardly, the control unit may drive the first actuator 41 to move the base 22 downward.

Figure 8:
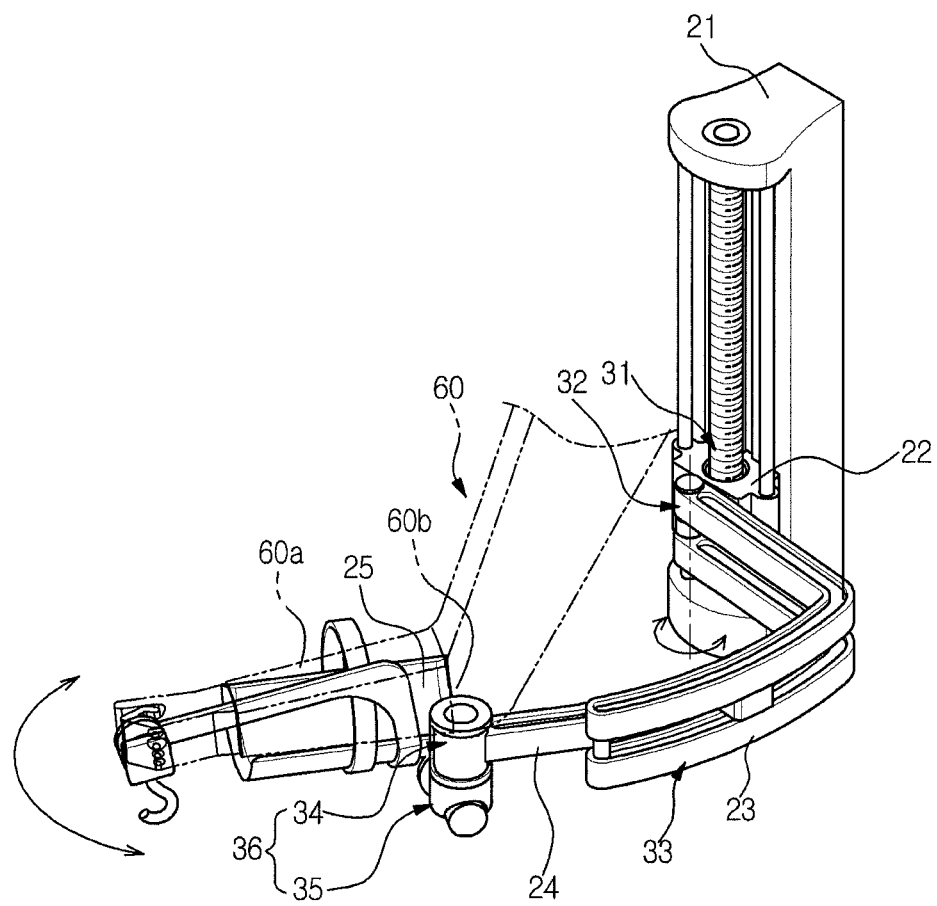
FIG. 8 is a view illustrating rotation of the entire arm in a yaw direction using the compact exoskeleton arm support device in accordance with example embodiments.

FIG. 8 is a view illustrating rotation of the entire arm in a yaw direction using the compact exoskeleton arm support device in accordance with example embodiments.

As shown in FIGS. 1 to 8, the first rotating joint 32 of the arm support device 10 may cause the entire arm 60 to perform reciprocating rotation in the yaw direction. The first rotating joint 32 may cause the first supporter 23 to rotate relative to the base 22.

The first rotating joint 32 may be manually driven by user force. Since the first rotating joint 32 may move regardless of movement of the arm 60 in the gravity direction, a separate actuator may not be installed on the first rotating joint 32 and the first rotating joint 32 may be driven by user force. The user may drive the first rotating joint 32 without difficulty. As a result, the number of actuators used in the arm support device 10 may be reduced.

Figure 9:
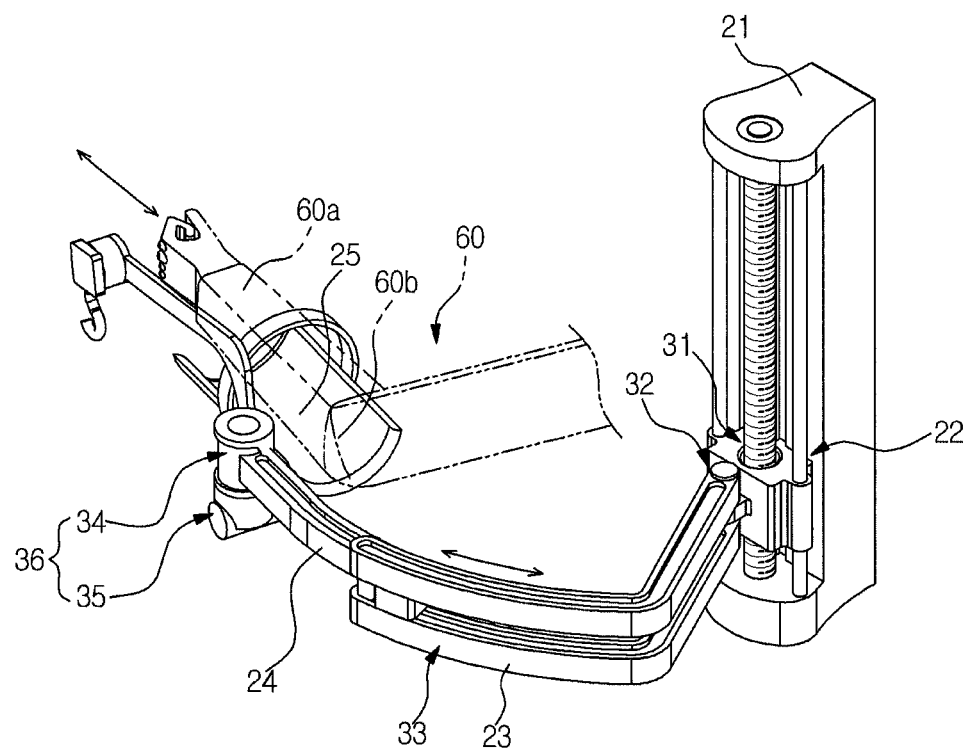
FIG. 9 is a view illustrating translation of a forearm of the arm using the compact exoskeleton arm support device in accordance with example embodiments.

FIG. 9 is a view illustrating translation of a forearm of the arm using the compact exoskeleton arm support device in accordance with example embodiments.

As shown in FIGS. 1 to 9, the second translating joint 33 of the arm support device 10 may cause the forearm 60a of the arm 60 to perform reciprocating translation in the forward and backward direction. The second translating rotating joint 33 may cause the second supporter 24 to slidably translate relative to the first supporter 23.

The second translating joint 33 may be manually driven by user force. Because the second translating joint 33 may move regardless of movement of the arm 60 in the gravity direction, a separate actuator may not be installed on the second translating joint 33 and the second translating joint 33 may be driven by user force. The user may drive the second translating joint 33 without difficulty. As a result, the number of actuators used in the arm support device 10 may be reduced.

As described above, the first translating joint 31, the first rotating joint 32, and the second translating joint 33 may determine the position of an elbow 60b. Because the position of the elbow 60b may be freely changed by the first translating joint 31, the first rotating joint 32, and the second translating joint 33, a user may easily work on a cell-type manufacturing line.

Figure 10:
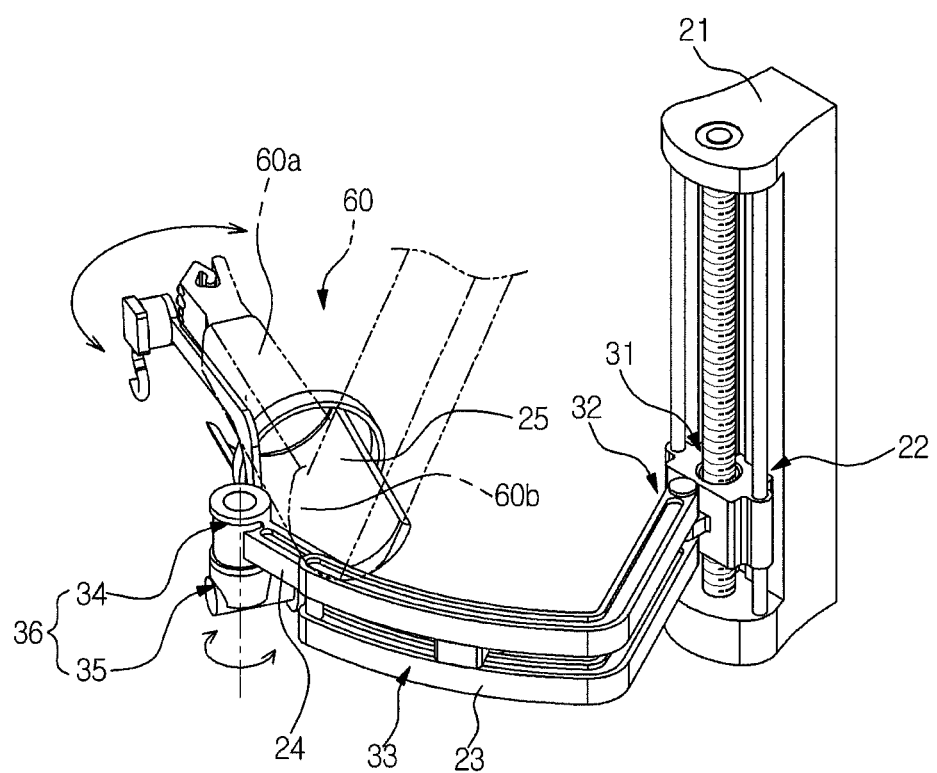
FIG. 10 is a view illustrating rotation of the forearm of the arm in the yaw direction using the compact exoskeleton arm support device in accordance with example embodiments.

FIG. 10 is a view illustrating rotation of the forearm of the arm in the yaw direction using the compact exoskeleton arm support device in accordance with example embodiments.

As shown in FIGS. 1 to 10, the second rotating joint 34 of the arm support device 10 may cause the forearm 60a of the arm 60 to perform reciprocating rotation in the yaw direction. The second rotating joint 34 of the elbow joint unit 36 may cause the forearm support unit 25 to rotate in the yaw direction relative to the second supporter 24.

The second rotating joint 34 may be manually driven by user force. Because the second rotating joint 34 may move regardless of movement of the arm 60 in the gravity direction, a separate actuator may not be installed on the second rotating joint 34 and the second rotating joint 34 may be driven by user force. The user may drive the second rotating joint 34 without difficulty. As a result, the number of actuators used in the arm support device 10 may be reduced.

Figure 11:
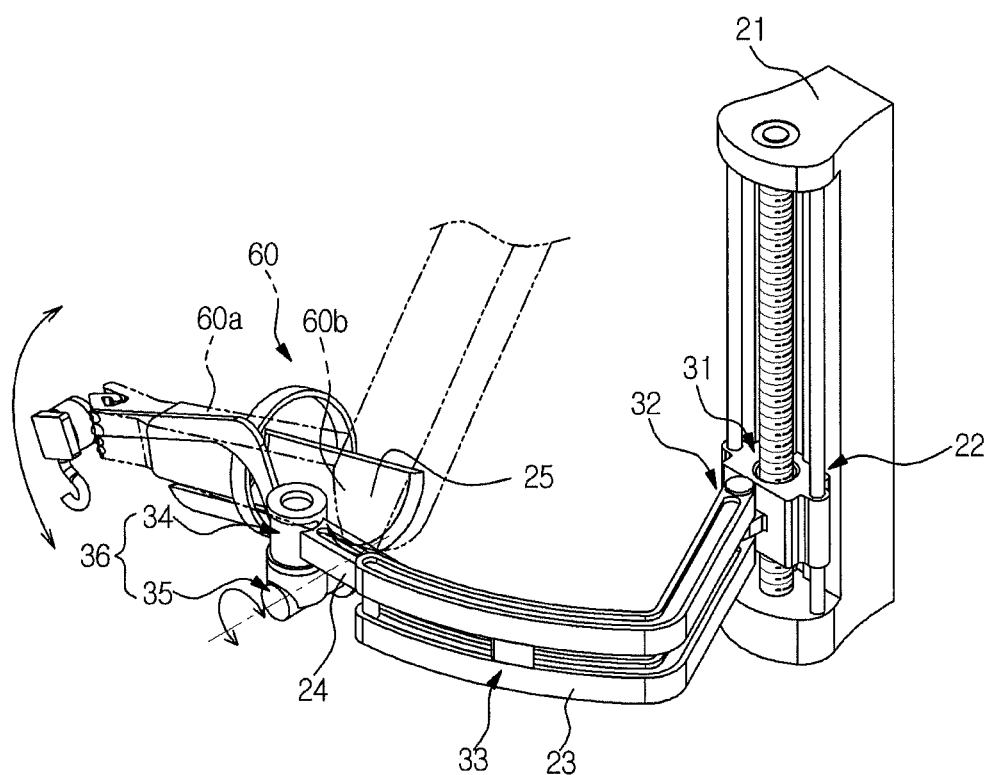
FIG. 11 is a view illustrating rotation of the forearm of the arm in a pitch direction using the compact exoskeleton arm support device in accordance with example embodiments.

FIG. 11 is a view illustrating rotation of the forearm of the arm in a pitch direction using the compact exoskeleton arm support device in accordance with example embodiments.

As shown in FIGS. 1 to 11, the third rotating joint 35 of the arm support device 10 may cause the forearm 60a of the arm 60 to perform reciprocating rotation in the pitch direction. The third rotating joint 35 may cause the forearm support unit 25 to rotate in the pitch direction relative to the second supporter 24.

The third rotating joint 35 may be driven by the second actuator 42. If the control unit checks movement of the arm 60 using the first sensor 51 and the second sensor 52, the second actuator 42 may drive the third rotating joint 35 to compensate for the movement of the arm 60 in the gravity direction. When the control unit understands that the arm 60 moves upward, the control unit may drive the second actuator 42 to move the forearm support unit 25 upward, and when the control unit understands that the arm 60 moves downward, the control unit may drive the second actuator 42 to move the forearm support unit 25 downward.

As described above, the second rotating joint 34 and the third rotating joint 35 may determine the orientation of the forearm 60a of the arm 60. Since the orientation of the forearm 60a may be freely changed by the second rotating joint 34 and the third rotating joint 35, a user may easily work on a cell-type manufacturing line.

Consequently, the arm support device 50 may provide a motion to optimize the movement of the arm using the five joints 31-35. Further, the arm support device 50 may compensate for gravity against load of an object or an arm only using the two actuators 40 reducing production costs and product weight.

As is apparent from the above description, a compact exoskeleton arm support device may compensate for gravity in accordance with example embodiments and reduce worker fatigue as a result of repetitious tasks.

Further, the compact exoskeleton arm support device may compensate for gravity and easily allow movement of a heavy object, thereby reducing an assembly time in an assembly line and increasing production efficiency.

Moreover, the compact exoskeleton arm support device compensating for gravity may reduce production costs.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. A compact exoskeleton arm support device to compensate for gravity and to support an arm using a plurality of members, the plurality of members comprising:
    a first rotating joint enabling the entire arm to rotate in a yaw direction;
    a second rotating joint enabling a forearm of the arm to rotate in the yaw direction;
    a third rotating joint enabling the forearm of the arm to rotate in a pitch direction;
    a first translating joint enabling the forearm of the arm to translate in a gravity direction; and
    a second translating joint arranged between the first rotating joint and second rotating joint, and enabling the second rotating joint to translate,
    wherein the first rotating joint, the second rotating joint, and the second translating joint are manually driven by user force, and the third rotating joint and the first translating joint are driven by actuators.

2. The compact exoskeleton arm support device to compensate for gravity according to claim 1, further comprising a first sensor to sense a load of the arm and to drive the actuators.

3. The compact exoskeleton arm support device to compensate for gravity according to claim 2, further comprising a second sensor to sense a load of an object applied to the arm and to drive the actuators in cooperation with the first sensor.

4. The compact exoskeleton arm support device to compensate for gravity according to claim 3, further comprising a control unit to check movement of the arm using the first sensor and the second sensor.

5. The compact exoskeleton arm support device to compensate for gravity according to claim 1, wherein the plurality of members includes a frame, and a base connected to the frame by the first translating joint allowing the base to translate.

6. The compact exoskeleton arm support device to compensate for gravity according to claim 5, wherein the actuators include a first actuator driving the first translating joint to move the base.

7. The compact exoskeleton arm support device to compensate for gravity according to claim 5, wherein the plurality of members further includes a first supporter connected to the base by the first rotating joint allowing the first supporter to rotate.

8. The compact exoskeleton arm support device to compensate for gravity according to claim 7, wherein the plurality of members further includes a second supporter connected to the first supporter by the second translating joint allowing the second supporter to translate.

9. The compact exoskeleton arm support device to compensate for gravity according to claim 8, wherein the plurality of members further includes a forearm support unit connected to the second supporter by the second rotating joint and the third rotating joint allowing the forearm support unit to rotate.

10. The compact exoskeleton arm support device to compensate for gravity according to claim 9, wherein the actuators include a second actuator driving the third rotating joint to rotate the forearm support unit.

11. The compact exoskeleton arm support device to compensate for gravity according to claim 10, further comprising a first sensor installed on the third rotating joint to sense a load of the arm applied to the forearm support unit.

12. The compact exoskeleton arm support device to compensate for gravity according to claim 11, wherein the forearm support unit further includes:
 an object fixing part to support an object; and
 a second sensor installed on the object fixing part to sense a load of the object applied to the forearm support unit.

13. The compact exoskeleton arm support device to compensate for gravity according to claim 3, wherein each of the first sensor and the second sensor includes a force-torque sensor.

14. A compact exoskeleton arm support device to compensate for gravity to assist movement of an arm using a plurality of joints, the plurality of joints comprising:
 a first rotating joint enabling the entire arm to rotate in a yaw direction, a first translating joint enabling a forearm of the arm to perform a first translation, and a second translating joint enabling the forearm of the arm to perform a second translation, to determine a position of an elbow of the arm; and
 a second rotating joint enabling the forearm of the arm to rotate in the yaw direction, and a third rotating joint enabling the forearm of the arm to rotate in a pitch direction to determine a position of the forearm of the arm,
 wherein, among the plurality of joints, the first translating joint determines the position of the elbow of the arm in a gravity direction and the third rotating joint determines the position of the forearm of the arm in a pitch direction and are driven by actuators, and remaining joints are driven by user force.

* * * * *